United States Patent
Inoue et al.

(10) Patent No.: US 9,745,723 B2
(45) Date of Patent: Aug. 29, 2017

(54) CONSTRUCTION MACHINE AND BATTERY PACK THEREOF

(71) Applicant: Hitachi Construction Machinery Co., Ltd., Tokyo (JP)

(72) Inventors: Takeshi Inoue, Tokyo (JP); Motoo Futami, Tokyo (JP); Ken Takeuchi, Kasumigaura (JP); Kei Sakabe, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/955,411

(22) Filed: Dec. 1, 2015

(65) Prior Publication Data

US 2016/0083932 A1 Mar. 24, 2016

Related U.S. Application Data

(63) Continuation of application No. 14/237,174, filed as application No. PCT/JP2012/070753 on Aug. 15, 2012, now abandoned.

(30) Foreign Application Priority Data

Sep. 22, 2011 (JP) .................. 2011-208102

(51) Int. Cl.
E02F 9/20 (2006.01)
E02F 9/26 (2006.01)
(Continued)

(52) U.S. Cl.
CPC ......... *E02F 9/2091* (2013.01); *B60L 11/1861* (2013.01); *E02F 9/207* (2013.01);
(Continued)

(58) Field of Classification Search
None
See application file for complete search history.

(56) References Cited

U.S. PATENT DOCUMENTS 7,508,168 B2 * 3/2009 Nunomaki ............ H01M 10/48
320/132
8,838,318 B2 * 9/2014 Segawa .................. G01C 21/34
701/22

(Continued)

FOREIGN PATENT DOCUMENTS

| JP | 06021867 A | 1/1994 |
| JP | 08201488 A | 8/1996 |
| JP | 2005536172 A | 11/2005 |
| JP | 2007288894 A | 11/2007 |
| JP | 2009197514 A | 9/2009 |

OTHER PUBLICATIONS

English Translation of JP2009197514, accessed Oct. 1, 2016 from Espacenet.*

*Primary Examiner* — Krishnan Ramesh
(74) *Attorney, Agent, or Firm* — Crowell & Moring LLP

(57) ABSTRACT

Construction machine including: an inverter; a battery; a battery controller; a main controller controlling the inverter based on limited power modes prescribed; and a display device displaying a remaining battery electric power. The main controller calculates open circuit voltage and battery resistance values of the battery at the state of energy of the battery based on the specification information about the battery and state of energy of the battery which are input from the battery controller, calculates an amount of electric power stored in the battery in each of the limited power modes based on the open circuit voltage value and battery resistance value of the battery as well as limited power and operating voltage prescribed for each of the limited power modes, and outputs a display signal for displaying the amount of electric power stored in the battery in each of the limited power.

3 Claims, 10 Drawing Sheets

(51) Int. Cl.
   *B60L 11/18*    (2006.01)
   *H02J 7/00*     (2006.01)
   *H01M 10/48*    (2006.01)
   *H01M 10/42*    (2006.01)
   *G01R 31/36*    (2006.01)

(52) U.S. Cl.
   CPC .............. *E02F 9/2075* (2013.01); *E02F 9/26* (2013.01); *H01M 10/42* (2013.01); *H01M 10/48* (2013.01); *H02J 7/0047* (2013.01); *B60L 2200/40* (2013.01); *B60L 2240/547* (2013.01); *B60L 2240/549* (2013.01); *B60L 2250/16* (2013.01); *B60L 2260/26* (2013.01); *G01R 31/3655* (2013.01); *H01M 10/488* (2013.01); *H01M 2010/4271* (2013.01); *H01M 2220/20* (2013.01); *H02J 2007/005* (2013.01); *Y02T 10/7005* (2013.01); *Y02T 10/705* (2013.01); *Y02T 10/7044* (2013.01)

(56) References Cited

U.S. PATENT DOCUMENTS

| | | | |
|---|---|---|---|
| 9,035,611 B2* | 5/2015 | Kikuchi | B60L 3/0046 320/116 |
| 2004/0005497 A1* | 1/2004 | Nunomaki | H01M 10/48 429/92 |
| 2006/0006842 A1 | 1/2006 | Miskovic et al. | |
| 2007/0145954 A1* | 6/2007 | Kawahara | B60L 11/1864 320/150 |
| 2009/0287366 A1* | 11/2009 | Davis | B60K 6/48 701/22 |
| 2011/0178745 A1* | 7/2011 | Kobayashi | G01R 31/3682 702/63 |
| 2012/0025769 A1* | 2/2012 | Kikuchi | B60L 3/0046 320/118 |
| 2012/0029851 A1* | 2/2012 | Nakayama | G01R 31/3624 702/63 |
| 2013/0073236 A1 | 3/2013 | Wu | |
| 2014/0046595 A1* | 2/2014 | Segawa | G01C 21/34 701/541 |

* cited by examiner

FIG.3

| VOLTAGE (V) | CHARGING RATE (%) |
|---|---|
| 3.0 | 0 |
| 3.1 | 10 |
| ⋮ | ⋮ |
| 4.1 | 100 |

61 — VOLTAGE (V) column
62 — CHARGING RATE (%) column

OCV TABLE

FIG.4

| CHARGING RATE (%) 71 | CURRENT (A) 72 | RESISTANCE (mΩ) 73 |
|---|---|---|
| 0 | −40 | 10 |
|   | −20 | 12 |
|   | 0 | 20 |
|   | 20 | 12 |
|   | 40 | 10 |
| 10 | −40 | 10 |
|   | −20 | 12 |
|   | 0 | 20 |
|   | 20 | 12 |
|   | 40 | 10 |
| ⋮ | ⋮ | ⋮ |
| 100 | −40 | 8 |
|   | −20 | 10 |
|   | 0 | 17 |
|   | 20 | 10 |
|   | 40 | 8 |

RESISTANCE TABLE

FIG.5

| ITEM | | VALUE |
|---|---|---|
| NO. OF LIMITED POWER MODES | | 2 |
| FIRST LIMITED POWER MODE (FULL POWER MODE) | LIMITED POWER | 50kW |
| | MINIMUM VOLTAGE | 170V |
| SECOND LIMITED POWER MODE (ECONOMY MODE) | LIMITED POWER | 30kW |
| | MINIMUM VOLTAGE | 170V |

| ITEM | | VALUE | |
|---|---|---|---|
| 81 — FIRST LIMITED POWER MODE (FULL POWER MODE) | TOTAL ELECTRIC POWER E01 | 5kWh | — 83 |
| | REMAINING ELECTRIC POWER E1 | 2kWh | — 84 |
| 82 — SECOND LIMITED POWER MODE (ECONOMY MODE) | TOTAL ELECTRIC POWER E02 | 1kWh | |
| | REMAINING ELECTRIC POWER E2 | 1kWh | |

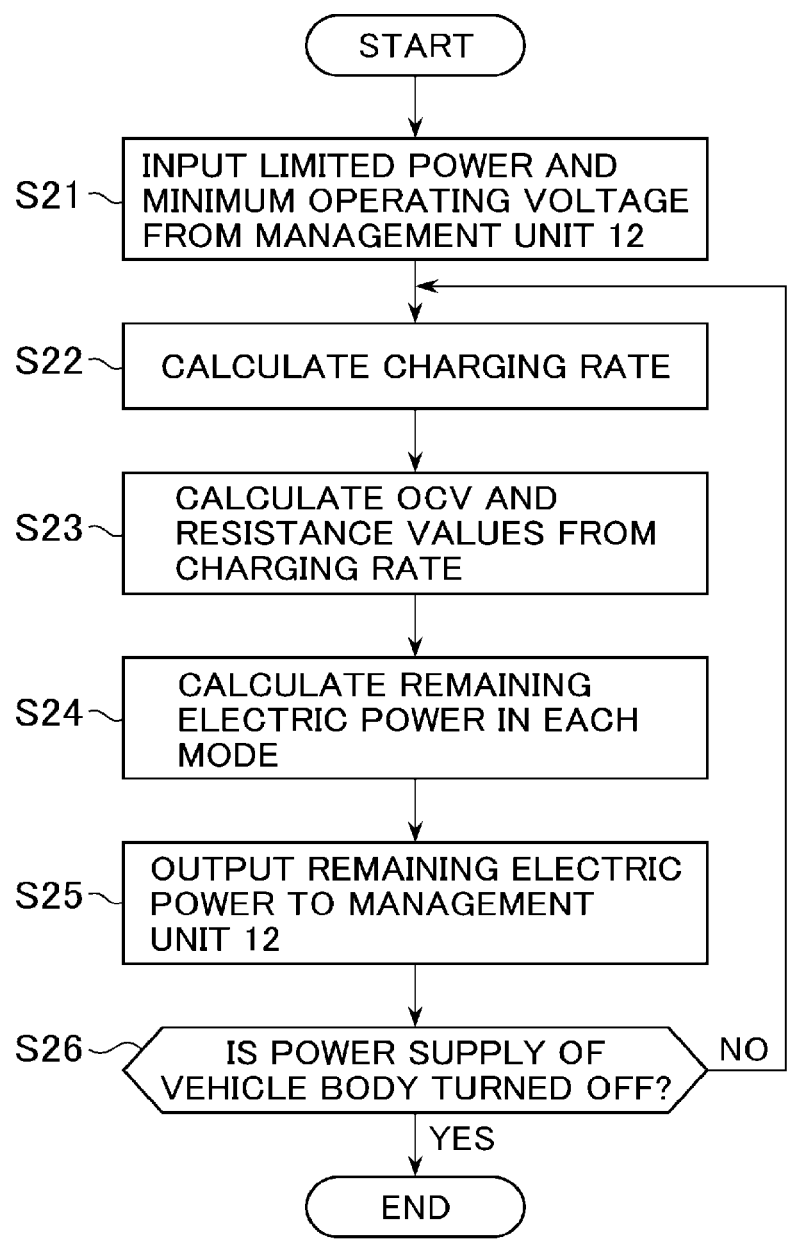

CONSTRUCTION MACHINE AND BATTERY PACK THEREOF

TECHNICAL FIELD

The present invention relates to a construction machine that converts electric power stored in a battery into motive power.

BACKGROUND ART

Some construction machines are furnished with a battery and have electric power stored in the battery converted to motive power. The construction machines of this type include a battery-driven hydraulic shovel (battery shovel) having a battery and a motor in place of the engine so that the motor drives a hydraulic pump to operate a hydraulic actuator; a hybrid hydraulic shovel equipped with an engine, a battery, and a generator motor; and a wheel loader and a dump truck each getting the electric power of a battery to drive a traction motor.

The battery mounted on this type of construction machine provides large-capacity output and is expensive but permits lower energy output per unit weight than kerosene that is used to drive the engine. This poses a big challenge: how to increase the amount of work and extend operation hours by effectively utilizing a limited-capacity battery that can be mounted onboard the machine.

One construction machine taking the above aspect into account has an inverter device mounted onboard thereby to calculate an amount of electric power stored in an onboard battery so that if the amount of electric power is determined to be low, the maximum output of an onboard electric actuator is reduced (see JP-2009-197514-A). That is, before and after the amount of electric power is determined to be low, this technique involves the use of a plurality of modes for limiting battery output (the modes may be called the power-limited modes hereunder where appropriate). Another technique, related not to construction machines but to electric vehicles, involves getting an onboard controller to calculate the amount of electric power (Wh) stored in an onboard battery so that the calculated amount of electric power is displayed on a display device (see JP-8-201488-A).

PRIOR ART DOCUMENT

Patent Documents

Patent Document 1: JP-2009-197514-A
Patent Document 2: JP-8-201488-A

SUMMARY OF THE INVENTION

Problems to be Solved by the Invention

Meanwhile, when the construction machine is controlled based on a plurality of limited power modes as with the above-cited technique, an amount of electric power stored in the battery (remaining electric power) in the currently selected limited power mode is displayed, but an amount of electric power stored in the battery (remaining electric power) corresponding to the other limited power modes not currently selected cannot be displayed. For example, if a first and a second limited power mode are automatically switched and if the first mode is currently selected, a remaining electric power of the second mode cannot be displayed as long as the first mode is being selected.

Also, one method of calculating the remaining electric power of the battery uses: (1) the state of charge (state of energy) of the battery in question (e.g., charging rate), (2) the voltage of the battery (battery voltage) and its internal resistance, and (3) the clamping voltage and minimum voltage for the construction machine in each of the limited power modes involved. The data of the category (1) above is calculated consecutively by a battery control unit (battery management unit) acting as control means for managing the charging and discharging of the battery. The data of the category (2) is held by the battery control unit. The data of the category (3) is held by a main control unit (construction machine management unit) acting as control means for controlling the construction machine. Thus when the main control unit is to calculate the remaining electric power, the data of the category (2) constituting the specifications of the battery is stored beforehand in the main control unit, and the data of the category (1) input consecutively from the battery control unit is used to make the calculation.

However, with a view to improving safety, the battery control unit and the battery are frequently integrated to form a battery pack (e.g., of lithium ion battery), so that when the battery is replaced, the battery control unit needs to be replaced as well. That is, when the above-cited method is adopted to calculate the remaining electric power using the main control unit and when the battery is replaced with one having different specifications, it is necessary to overwrite the data of the category (2) stored in the main control unit with the data of the new battery, which can make battery replacement work complicated.

An object of the present invention is to provide a construction machine that can display the remaining electric power corresponding to unselected limited power modes and that permits easy battery replacement work.

Means for Solving the Problems

In carrying out the above-mentioned object, the present invention provides a construction machine for converting electric power stored in a battery into motive power. The construction machine includes a control section configured to control the construction machine based on a plurality of limited power modes prescribed to control the output of the battery, and calculate the remaining electric power of the battery in each of the limited power modes based on specification information about and the state of energy (state of charge) of the battery and on the limited power and operating voltage prescribed for each of the limited power modes; and a display device configured to display the remaining electric power in each of the limited power modes based on the remaining electric power calculated by the control section.

Effect of the Invention

According to the present invention, the remaining electric power corresponding to the limited power modes not currently selected is displayed. This makes it possible to proceed with work while verifying the actual remaining electric power and permits easier battery replacement work.

BRIEF DESCRIPTION OF THE DRAWINGS

FIG. 3 is a function table listing open circuit voltages OCV and charging rates for any one of different embodiments of the present invention;

FIG. 4 is a function table listing battery resistance values R and charging rates in effect for any one of different embodiments of the present invention;

FIG. 5 is a table listing limited power and a minimum operating voltage in each of limited power modes of the hydraulic shovel according to any one of different embodiments of the present invention;

FIG. 13 is a flowchart of a remaining electric power calculation process performed by a battery management unit according to a second embodiment of the present invention.

MODES FOR CARRYING OUT THE INVENTION

Figure 1:
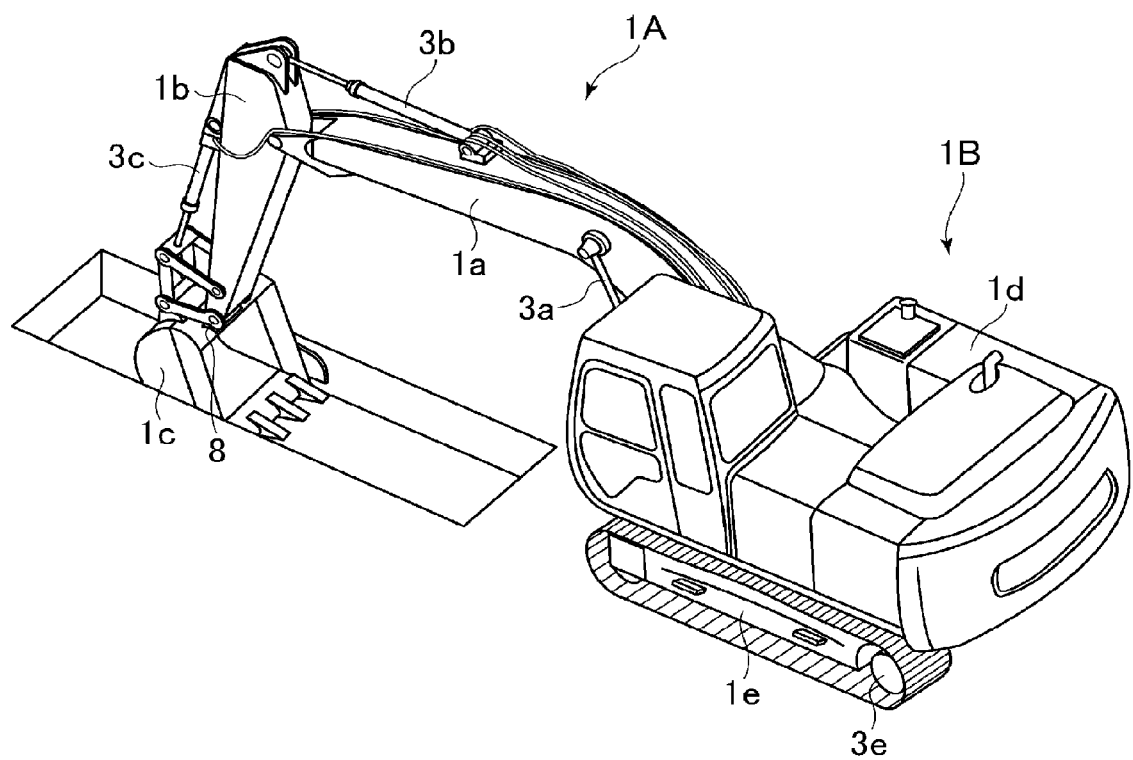
FIG. 1 is an external view of a battery-driven hydraulic shovel according to any one of different embodiments of the present invention.

Some embodiments of the present invention are explained below with reference to the accompanying drawings. FIG. 1 is an external view of a battery-driven hydraulic shovel (battery shovel) according to one of different embodiments of the present invention. The hydraulic shovel in this drawing is equipped with an articulated work device 1A that includes a boom 1a, an arm 1b and a bucket 1c, and a vehicle body 1B that includes an upper swing structure 1d and a lower track structure 1e.

The boom 1a is supported rotatably by the upper swing structure 1d and driven by a hydraulic cylinder (boom cylinder) 3a. The arm 1b is supported rotatably by the boom 1a and driven by a hydraulic cylinder (arm cylinder) 3b. The bucket 1c is supported rotatably by the arm 1b and driven by a hydraulic cylinder (bucket cylinder) 3c. The upper swing structure 1d is driven swingably by an electric motor (swing motor, not shown), and the lower track structure 1e is driven by a right-hand and a left-hand traction motor (hydraulic motors) 3e and 3f (not shown). The hydraulic cylinder 3a, hydraulic cylinder 3b, hydraulic cylinder 3c, and traction motors 3e and 3f are driven with a hydraulic fluid drawn by a hydraulic pump 6 (see FIG. 2) from a tank 9.

Figure 2:
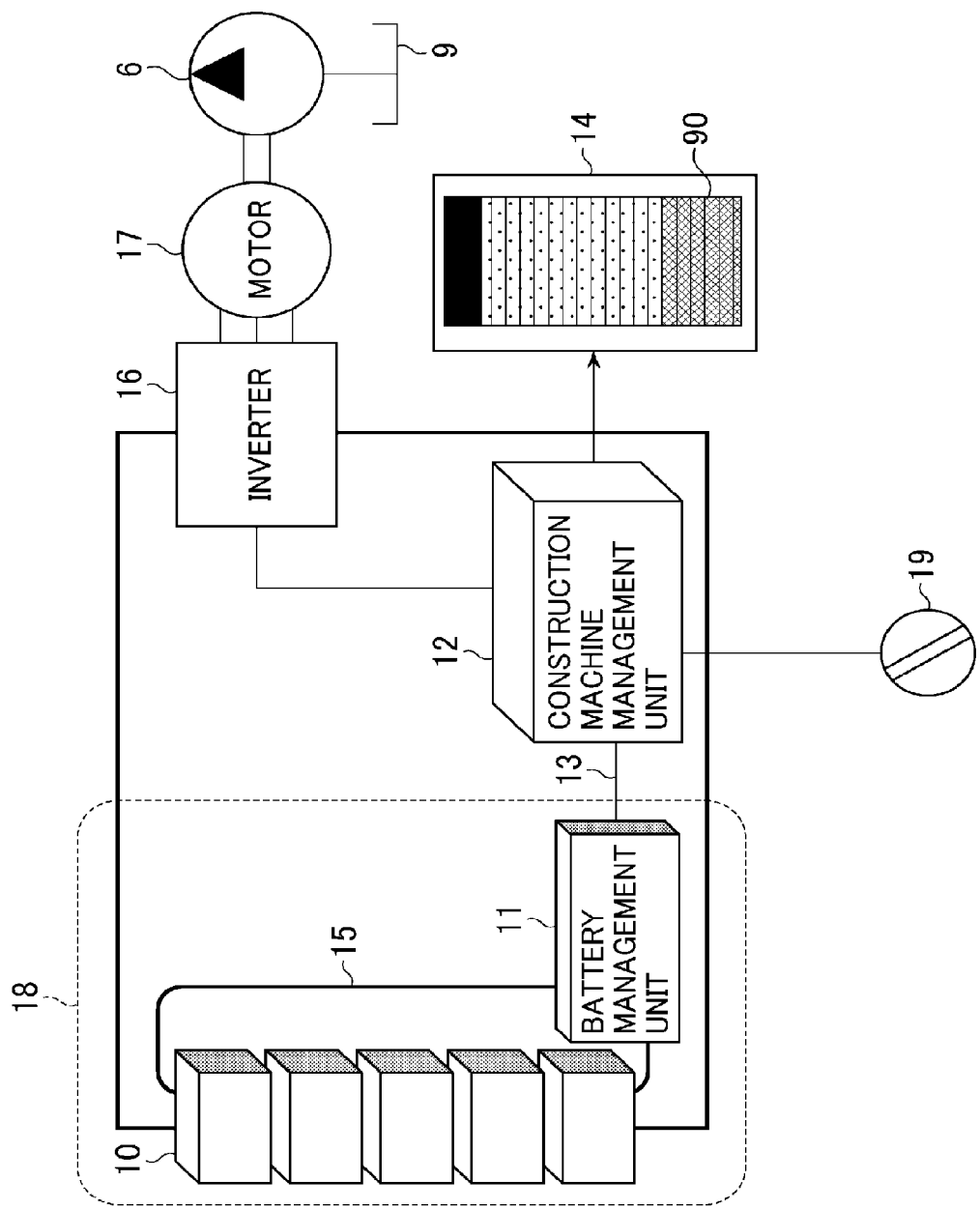
FIG. 2 is a block diagram of an electrical storage system mounted on a hydraulic shovel according to any one of different embodiments of the present invention.

FIG. 2 is a block diagram of an electrical storage system mounted on a hydraulic shovel according to any one of different embodiments of the present invention. The electrical storage system shown in this drawing includes a battery pack 18, a construction machine management unit (main control device (main control section)) 12 that controls the hydraulic shovel based on a plurality of limited power modes (to be discussed later) prescribed to control the output of the battery pack 18, a display device 14 that displays the remaining electric power of the battery pack 18 in meter form 90, a mode switching device 19 that switches to the limited power mode desired by the operator, an inverter device (power conversion device) 16 that converts DC power from the battery pack 18 into AC power for control over a motor 17, the three-phase AC motor (motor) 17 that generates motive power from the electric power of the battery pack 18, and the hydraulic pump 6 driven by the motor 17.

The construction machine management unit 12 has a hardware structure that includes an arithmetic processing unit (e.g., CPU) that executes diverse control programs and a storage device (e.g., ROM, RAM) that stores these control programs and various data (all not shown).

The battery pack 18 includes battery modules 10, a battery management unit (battery control device (battery control section)) 11, and a communication line 15 that connects the battery management unit 11 to the battery modules 10. The battery pack 18 is detachably mounted on the hydraulic shovel and may be replaced as needed upon battery deterioration, component failure, etc.

The battery modules 10 are composed of a plurality of individual batteries (battery cells) connected in serial-parallel fashion as needed. Generally, the battery modules 10 are constituted by about 4 to 40 batteries connected in series and are housed in a box. Although the battery pack 18 in FIG. 2 is shown having the battery modules 10 connected in series, the battery modules 10 may be connected alternatively in serial-parallel fashion.

The battery management unit 11 calculates the state of charge value (SOC), the state of health (SOH), etc., of the battery pack 18 and monitors whether the battery pack 18 is being overcharged or overdischarged. The battery management unit 11 has a hardware structure that includes an arithmetic processing unit (e.g., CPU) that executes diverse control programs and a storage device (e.g., ROM, RAM) that stores these control programs and various data (these units not shown). The battery management unit 11 of this embodiment calculates a "charging rate" as the value representing the state of charge of the battery pack 18. In this context, the charging rate may be defined as "100%–100× current discharged quantity relative to full charge/full charge capacity."

Also, the battery management unit 11 stores open circuit voltages OCV[V] and battery resistance values R[Ω] as the specification information about the batteries making up the battery pack 18. Because these values (OCV[V], R[Ω]) vary depending on the state of charge of the batteries, the battery management unit 11 of this embodiment stores in tabular form the relations between charging rates [%] and open circuit voltages OCV[V] and between charging rates [%] and battery resistance values R[Ω] (see FIGS. 3 and 4). The open circuit voltages OCV and battery resistance values R are calculated based on the information in these tables and on the charging rates calculated by the battery management unit 11.

FIG. 3 is a function table (OCV table) listing open circuit voltages OCV and charging rates in effect for any one of different embodiments of the present invention. In FIG. 3, the OCV values are shown constituting part of a function table listing the voltages OCV[V] a short time after the batteries have stopped being charged or discharged in association with corresponding charging rates [%]. In the example of this table, the charging rates are given in steps of 10%, each charging rate being set with an OCV. Thus, if the calculated charging rate is not found in the OCV table, two OCVs corresponding to the two charging rates closest to the calculated rate are used to calculate an eventual OCV. That is, the OCV when the charging rate is 15% may be calculated from the OCV values corresponding to the charging rates of 10% and 20%.

Also, when it is desired to convert the charging rate to a discharged quantity [Ah] represented by "x" in OCV(x) in the expression (3) to be discussed later, the expression (1) below may be used. One way of calculating the charging rate initial value is by making calculations from the OCV table in FIG. 3 based on the voltages before the construction machine is operated. The charging rate while the construction machine is being operated may be calculated using the formula "charging rate initial value+current integration/fully charged capacity×100." Alternatively, while the construction machine is being operated, the open circuit voltage of the batteries may be estimated based on the resistance, and the charging rate may be estimated from the OCV table in FIG. 3.

[Math. 1]

$$x \text{ (Ah)} = \text{fully charged capacity (Ah)} \times (1 - \text{charging rate}/100) \quad (1)$$

Incidentally, the OCV table in FIG. 3 lists voltages for each of the battery cells configured. For this reason, when the voltage of the entire battery pack 18 is to be calculated, the calculation is performed through multiplication by the number of the batteries contained in the battery pack (e.g., by the number of serially connected batteries). One way of setting the OCV table is by changing the charging rate from 0% to 100% in steps of 10%, so as to generate the table based on the voltage obtained after the batteries have been stopped being charged or discharged for two hours.

Because the fully charged capacity of the batteries deteriorates over use, it is desirable to update the capacity value as needed with the battery management unit 11 using a known method (e.g., technique disclosed in JP-6-242193-A). In a specific calculation example, the charging rate prior to operation of the hydraulic shovel is first calculated using the OCV table in FIG. 3; the charging rate while the machine is in operation is separately calculated; the charging rate upon completion of the machine operation is calculated using the OCV table in FIG. 3, and the calculated values are put in the expression (2) to find the fully charged capacity. Incidentally, the battery management unit 11 is equipped with an ammeter. Thus the discharged quantity Q in the expression (2) below needs only to be calculated as an integrated value of the output values (current values) on that ammeter.

[Math. 2]

$$\text{Fully charged capacity (Ah)} = 100 \times Q / |\text{charging rate before operation} - \text{charging rate after operation}| \quad (2)$$

Q: Discharged quantity (Ah) during operation

FIG. 4 is a function table (resistance table) listing battery resistance values R and charging rates for any one of different embodiments of the present invention. In the example of FIG. 4, the resistance R is determined by the charging rate [%] and current value [A] (discharging side is regarded as + (plus)) of the battery pack 18. Because the charging rates in this resistance table are given in steps of 10%, calculating the resistance value relative to the charging rate of 15% involves using the charging rates of 10% and 20%, as in the case of FIG. 3. Meanwhile, the current values are given in steps of 20 [A]. Thus calculating the resistance value relative to the current of 30 [A] involves using the data of 20 [A] and 40 [A].

One way of setting the resistance table, for example, is as follows: If the resistance value relative to the current of 20 [A] is to be set when the charging rate is 40%, the current may be set to 20 [A] with the charging rate of 40% and left to that value for some time (e.g., for two minutes), before the difference between the voltage value Vs and the OCV value is divided by the value of 20 [A]. Also, because the resistance R becomes larger as the batteries deteriorate, it is preferred that the resistance table be updated as needed in keeping with the deterioration of the batteries. In this case, the difference between the OCV on the one hand and the voltage while the construction machine is in operation at a constant current for a predetermined time period (e.g., two minutes) on the other hand may be divided by the current to find the resistance value R. Furthermore, if the value corresponding to the charging rate and current in the resistance table of FIG. 4 is represented by "r," the ratio of the resistance to the above value (R/r) may be obtained. Then all resistance values in the table of FIG. 4 may be multiplied by the ratio (R/r) so as to update the resistance table.

Since the resistance of the batteries also varies with temperature, the resistance table of FIG. 4 may also include temperature values in addition to the other factors (charging rates and current values).

Back in FIG. 2, the battery management unit 11 and construction machine management unit 12 are interconnected by a communication line 13. The information stored in the management units 11 and 12 (e.g., OCV table, resistance table) and the information calculated by the management units 11 and 12 are exchanged over the communication line 13. Also, the battery management unit 11 is connected to the battery modules 10 via the communication line 15 and exchanges such information as voltages, temperatures and currents with the battery modules 10. The electric power of the battery pack 18 is supplied to the inverter 16.

With this embodiment, the construction machine management unit 12 mainly switches limited power modes in response to the input from the mode switching device 19, controls the hydraulic pump 6 under control of the inverter device 16, and performs display control of the display device 14. The construction machine management unit 12 also stores the limited power and operating voltage prescribed for each of a plurality of limited power modes.

FIG. 5 is a table listing limited power [kWh] and a minimum operating voltage[V] in each of limited power modes of the hydraulic shovel according to any one of different embodiments of the present invention. As shown in FIG. 5, the construction machine management unit 12 stores the number of limited power modes. With this embodiment, there are two limited power modes (a first limited power mode 34 and a second limited power mode 35). The first limited power mode 34 is a mode (full power mode) in which the hydraulic shovel is operated at full power. The second limited power mode 35 is a mode (economy mode (energy-saving mode)) in which power consumption is limited. In this context, the "limited power" means an upper limit of power over which electric power is not supplied. In the example of FIG. 5, the limited power is set to 50 [kW] for full power mode and 30 [kW] for economy mode. Also, the "minimum operating voltage" is a lower limit of operating voltage below which the operation of the inverter device 16 is not guaranteed. In the example of FIG. 5, the minimum operating voltage is set to 170[V] for both modes.

The value of limited power in each limited power mode may be predetermined by the designer or the like. Also, the temperatures of the inverter device 16 and motor 17 may be detected using sensors or the like and the detected temperatures may be used to correct the predetermined limited power values. In such a case, if the temperature of the motor 17 is, for example, 15° C. higher than the outdoor temperature, the limited power may be made lower than the default value by 10%.

In the above example, the operating voltage of the inverter device 16 is set to be the minimum operating voltage prescribed for each limited power mode. Alternatively, an operating voltage predetermined by the designer or the like may be utilized as long as that voltage value is higher than the minimum operating voltage. For example, a voltage value lower by 10% than the rated voltage of the motor 17 may be used as the operating voltage. Furthermore, although a voltage value (170[V]) common to all limited power modes is used as the minimum operating voltage in the example of FIG. 5, a different operating voltage may be used alternatively in each different limited power mode. Whereas there are two limited power modes in the example of FIG. 5, it is obvious that three or more limited power modes may be adopted instead.

The mode switching device 19 is a unit that selects one of a plurality of limited power modes stored in the construction machine management unit 12, and is connected to the construction machine management unit 12. The construction machine management unit 12 selects the limited power mode chosen by the operator via the mode switching device 19, and performs drive control of the hydraulic shovel based on the limited power mode thus selected. Incidentally, if the construction machine management unit 12 is configured to select automatically the limited power mode in accordance with the conditions of the hydraulic shovel (e.g., where the remaining electric power of the battery pack 18 is so low that only the mode of minimum limited power (economy mode of this embodiment) can be selected), the mode selected automatically by the construction machine management unit 12 may take precedence over the mode selected by the mode switching device 19.

The display device 14 is connected to the construction machine management unit 12, and displays the remaining electric power of the battery pack 18 in each of the limited power modes and the remaining operation hours indicative of how long the hydraulic shovel can operate in each limited power mode (e.g., see FIG. 10 to be explained later) on the basis of the input values from the construction machine management unit 12. On the screen of the display device 14, there is provided a display part that displays the remaining electric power of the battery pack 18 and the remaining operation hours of the hydraulic shovel (to be discussed later in detail).

Figure 6:
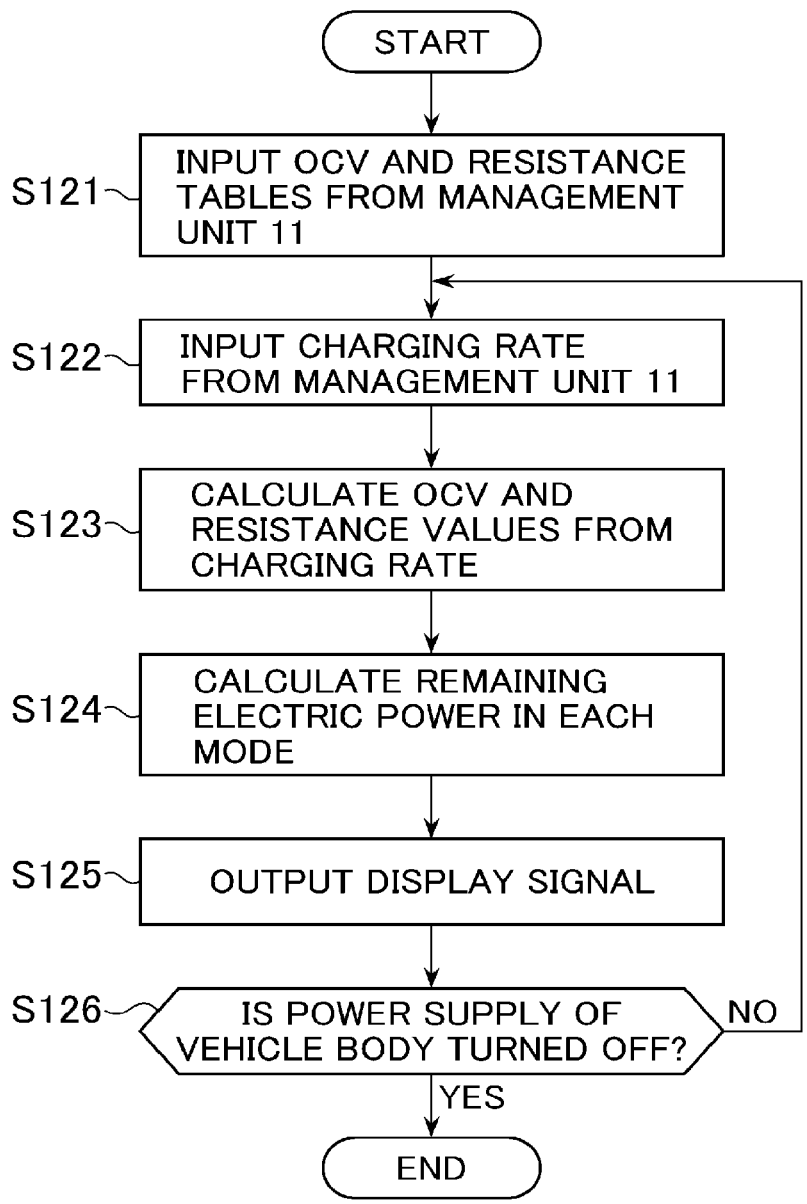
FIG. 6 is a flowchart of a remaining electric power calculation process performed by a construction machine management unit according to a first embodiment of the present invention.

FIG. 6 is a flowchart of a remaining electric power calculation process performed by the construction machine management unit 12 according to the first embodiment of the present invention. The flowchart in FIG. 6 is started when the power supply of the hydraulic shovel is turned on from the off-state. Carried out first is the process of inputting the OCV table (see FIG. 3) and resistance table (see FIG. 4) as the specification information about the battery pack 18 to the construction machine management unit 12 from the battery management unit 11 (step 121). The battery management unit 11 then performs the process of calculating the charging rate (state of charge value) and the discharged quantity of the battery pack 18 and outputting the result of the calculations to the construction machine management unit 12. The construction machine management unit 12 performs the process of inputting the charging rate in question (step 122).

Next, the construction machine management unit 12 performs the process of calculating the OCV value and resistance value of the battery pack 18 in the state of charge at that point based on the OCV table, resistance table, and charging rate input from the battery management unit 11 (step 123).

Next, the construction machine management unit 12 calculates the remaining electric power of the battery pack 18 in each of the limited power modes based on the OCV and resistance of the battery pack 18 calculated in step 123 and on the limited power and operating voltage prescribed for each limited power mode (see FIG. 5)(step 124). An example of the calculations involved is explained below with reference to FIG. 7. This is a calculation example in which the construction machine management unit 12 automatically selects one of a plurality of limited power modes in accordance with the conditions of the hydraulic shovel (the conditions being the limited power in each limited power mode and the battery voltage of the battery pack 18 in the example below). In the subsequent example, it is assumed that the first limited power mode where the limited power is relatively large is selected in the fully charged state and that the second limited power mode where the limited power is relatively small is automatically selected when the battery voltage of the battery pack 18 reaches the minimum operating voltage in the first limited power mode (i.e., when the discharged quantity of the battery pack 18 has reached x1 (to be discussed later)).

Figures 7, 8:
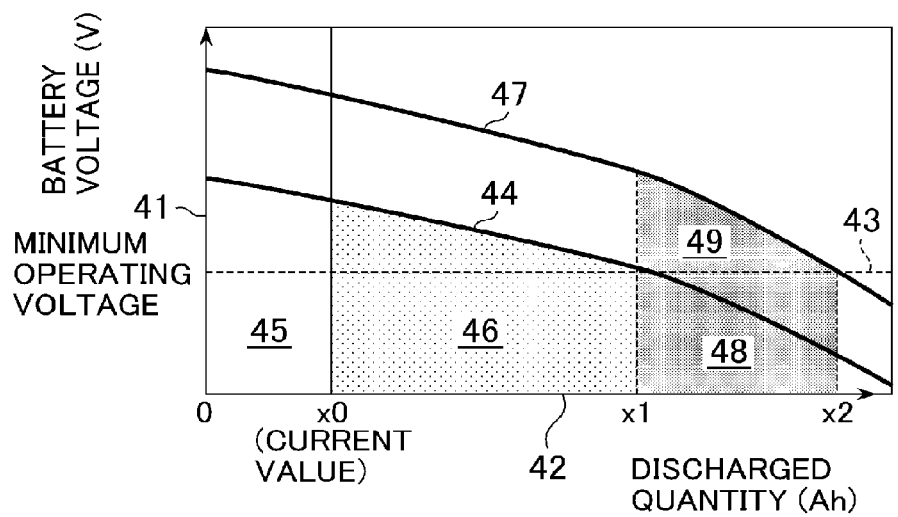
FIG. 7 is an explanatory drawing of a calculation example in which the remaining electric power is calculated when a limited power mode is automatically selected in accordance with the conditions of the hydraulic shovel.
FIG. 8 is a table listing the results of calculating total electric power levels E01 and E02 as well as remaining electric power levels E1 and E2 in each of different limited power modes.

FIG. 7 is an explanatory drawing of a calculation example in which the remaining electric power is calculated when a limited power mode is automatically selected in accordance with the conditions of the hydraulic shovel. In FIG. 7, a vertical axis 41 denotes the voltage[V] of the battery pack 18 and a horizontal axis 42 represents the discharged quantity [Ah] of the battery pack 18 (integrated value of discharged quantities [Ah] from the fully charged state). An indication x0 on the horizontal axis 42 denotes the current discharged quantity. Also, a minimum operating voltage 43 represents the value in FIG. 5 (170[V]) set for each limited power mode and stored beforehand in the construction machine management unit 12. A first battery voltage curve 44 in FIG. 7 is a curve that applies when the battery pack 18 is discharged at the current in the first limited power mode (corresponding to full power mode in FIG. 5). The current (I) in the first limited power mode may be obtained as the solution to the expression (3) given below.

[Math. 3]

$$\{OCV(x) - R(x,I) \times I\} \times I = P \tag{3}$$

OCV(x): Abbreviation for Open Circuit Voltage (calculated from the OCV table)[V]

R(x, I): Resistance function (calculated from the resistance table)[Ω]

I: Current [A]

P: Limited power [W]

x: Discharged quantity [Ah]

Since the OCV and R are calculated in step 123 and the limited power is predetermined as shown in FIG. 5 in the expression (3) above, the expression (3) above is turned into a quadratic equation for I. Thus, of the two solutions of I (I1 hereunder) obtained from the expression (3), the smaller solution is selected here (i.e., of the smaller current (lower than a predetermined limited current)). At this point, the curve obtained by the expression (4) below constitutes the first battery voltage curve 44 when the current I1 is allowed to flow.

[Math. 4]

$$\text{Battery voltage} = OCV(x) - R(x, I1) \times I1 \quad (4)$$

Obtained next is the discharged quantity x (represented by x1) at which the first battery voltage curve 44 reaches the minimum operating voltage 43. The discharged quantity is obtained by solving the expression (5) below.

[Math. 5]

$$\text{Minimum operating voltage} = OCV(x) - R(x, I) \times I \quad (5)$$

At this point, the remaining electric power E1 of the battery pack 18 when the hydraulic shovel is driven in the first limited power mode is acquired by integrating the expression (4) for the discharged quantity x over a section between the current discharged quantity x0 and the discharged quantity x1 (area of region 46). Also, the total electric power E01 in the first limited power mode (i.e., total electric power following discharge from the fully charged state up to x1) is obtained by integrating the expression (4) for the discharged quantity x over a section between x=0 and x1 (total area of regions 45 and 46). Alternatively, the total electric power E01 may be calculated from the remaining electric power when the hydraulic shovel is started.

Next, the remaining electric power E2 in the second limited power mode is obtained. The remaining energy E2 is acquired in the same manner as the remaining electric power E1 in the first limited power mode. A solution (assumed to be I2) of the expression (3) is first obtained, and the second battery voltage curve 47 when the current I2 is allowed to flow is acquired using the expression (6) below. Then the discharged quantity x (assumed to be x2) at which the second battery voltage curve 47 reaches the minimum operating voltage 43 is obtained.

In this manner, the total electric power E02 of the battery pack 18 when the hydraulic shovel is driven in the second limited power mode is obtained by integrating the expression (6) for the discharged quantity x over a section between the discharged quantity x1 and the discharged quantity x2 (total area of regions 48 and 49). The remaining electric power E2 of the battery pack 18 when the hydraulic shovel is driven in the second limited power mode is obtained by integrating the expression (6) for x over the section between the discharged quantity x1 and the discharged quantity x2 (total area of regions 48 and 49) when x1>x0 (i.e., when the first limited power mode is selected), or by integrating the expression (6) for x over a section between the discharged quantity x0 and discharged quantity x2 (total area of regions 48 and 49) when x1<x0 (i.e., when the second limited power mode is automatically selected).

[Math. 6]

$$\text{Battery voltage} = OCV(x) - R(x, I2) \times I2 \quad (6)$$

FIG. 8 is a table listing the results of calculating total electric power levels E01 and E02 as well as remaining electric power levels E1 and E2 in each of different limited power modes. The example in FIG. 8 is made up of two kinds of information: information about a first limited power mode 81 and information about a second limited power mode 82. The information about the first limited power mode is composed of total electric power 83 and remaining electric power 84, and so is the information about the second limited power mode made up of the total electric power and remaining electric power. The construction machine management unit 12 performs calculations to have the display device 14 display the remaining electric power and remaining operation hours in each limited power mode based on these results of the calculations.

Figure 9:
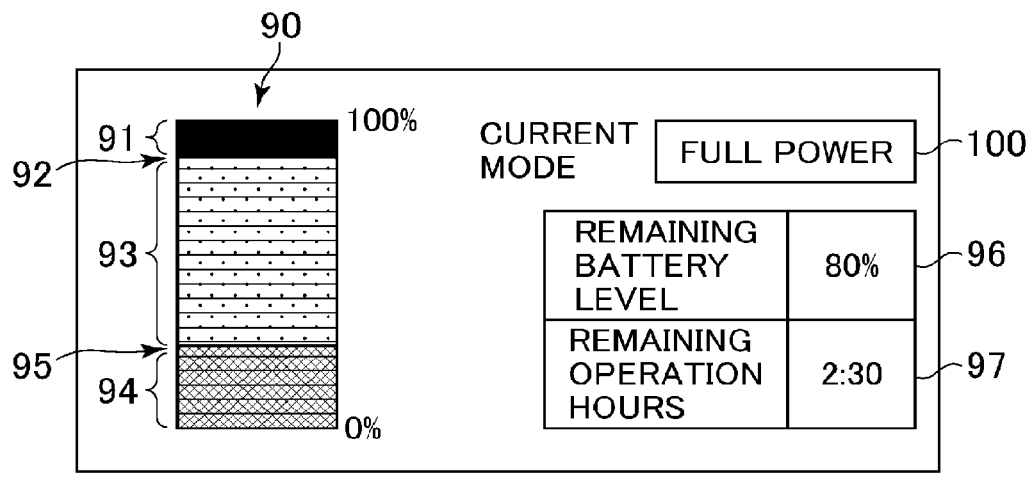
FIG. 9 is an illustration showing a display screen of a display device when a limited power mode is automatically selected in accordance with the voltage of a battery pack.

FIG. 9 is an illustration showing a display screen of the display device 14 when a limited power mode is automatically selected in accordance with the voltage of the battery pack 18. It is assumed here that the first and the second limited power modes are selected in a predetermined order in reference to the limited power of each limited power mode and the voltage of the battery pack 18 as discussed above. Specifically, the first limited power mode is being selected until the battery voltage reaches the operating voltage of the first limited power mode (170 [V]). Beyond that point, the second limited power mode is selected. Also, the display screen shown in FIG. 9 includes a selected mode display part 100, a meter display part 90, a remaining electric power display part 96, and a remaining operation hour display part 97.

The selected mode display part 100 is a part that displays the limited power mode currently selected by the construction machine management unit 12. In the example of FIG. 9, full power mode (first limited power mode) is shown selected by the construction machine management unit 12. The remaining electric power display part 96 is a part that displays the remaining electric power of the battery pack 18. What is displayed here is the sum of the remaining electric power levels when the first and the second limited power modes are selected in the above-mentioned order. Whereas the remaining electric power is shown displayed in percentage points [%] relative to the total electric power in the example of FIG. 9, the remaining electric power may be indicated alternatively in kilowatt-hours [kWh]. The remaining operation hour display part 97 is a part that displays the remaining operation hours [h] when the hydraulic shovel is operated with average power [W] prescribed for each limited power mode. What is displayed here is the sum of the remaining operation hours when the first and the second limited power modes are selected in the above-mentioned order.

The meter display part 90 is a part that visually displays currently remaining electric power 92 of the battery pack 18. As such, the meter display part 90 is composed of a first meter part 93 that indicates the remaining electric power in the limited power mode (first limited power mode) currently selected by the construction machine management unit 12, a second meter part 94 that indicates the remaining electric power in the limited power mode (second limited power mode) lastly selected by the construction machine management unit 12, and a consumption meter part 91 that indicates the electric power consumed so far. In the example of FIG. 9, the consumption meter part 91 is shown blacked out.

With this embodiment, the currently remaining electric power 92 of the battery pack 18 is the sum of the remaining electric power in the first limited power mode and the remaining electric power in the second limited power mode, the sum being calculated using the expression (7) below.

[Math. 7]

$$\text{Remaining electric power} = 100 \times (E1+E2)/(E01+E02) \quad (7)$$

E1: Remaining electric power (Wh) in the first limited power mode
E2: Remaining electric power (Wh) in the second limited power mode
E01: Total electric power (Wh) in the first limited power mode
E02: Total electric power (Wh) in the second limited power mode Also in the example of FIG. 9, the remaining electric power in the second limited power mode in a boundary position 95 between the first meter part 93 and the second meter part 94 is calculated using the expression (8) below.

[Math. 8]

$$\text{Remaining electric power in the second limited power mode} = 100 \times E2/(E01+E02) \quad (8)$$

E1: Remaining electric power (Wh) in the first limited power mode
E2: Remaining electric power (Wh) in the second limited power mode
E01: Total electric power (Wh) in the first limited power mode
E02: Total electric power (Wh) in the second limited power mode
E02: Total electric power (Wh) in the second limited power mode Whereas in the example of FIG. 9, the remaining electric power levels are shown displayed in meter form, the remaining operation hours may also be displayed in meter form. In this case, the remaining operation hours may be calculated using the expressions (9-1) through (9-3) below, and the remaining electric power in the second limited power mode in the boundary position 95 between the first meter part 93 and the second meter part 94 may be calculated using the expressions (10-1) through (10-3) below. The "average electric power in each limited power mode" for use in the calculations of remaining operation hours may be the most recent predetermined value (e.g., for the last five minutes) on the construction machine side, a predetermined value, or an actual value obtained in the past.

[Math. 9]

$$\text{Remaining operation hours} = (E1/W1)+(E2/W2) \quad (9\text{-}1)$$

$$\text{Total operation hours} = (E01/W1+E02/W2) \quad (9\text{-}2)$$

$$\text{Remaining hours} = 100 \times \text{remaining operation hours}/\text{total operation hours} \quad (9\text{-}3)$$

E1: Remaining electric power (Wh) in the first limited power mode
E2: Remaining electric power (Wh) in the second limited power mode
E01: Total electric power (Wh) in the first limited power mode
E02: Total electric power (Wh) in the second limited power mode
W1: Average power (W) in the first limited power mode
W2: Average power (W) in the second limited power mode

[Math. 10]

$$\text{Remaining operation hours in the second limited power mode} = (E2/W2) \quad (10\text{-}1)$$

$$\text{Total operation hours in the second limited power mode} = (E01/W1+E02/W2) \quad (10\text{-}2)$$

$$\text{Remaining hours in the second limited power mode} = 100 \times \text{remaining operation hours}/\text{total operation hours} \quad (10\text{-}3)$$

E1: Remaining electric power (Wh) in the first limited power mode
E2: Remaining electric power (Wh) in the second limited power mode
E01: Total electric power (Wh) in the first limited power mode
E02: Total electric power (Wh) in the second limited power mode
W1: Average power (W) in the first limited power mode
W2: Average power (W) in the second limited power mode Incidentally, this embodiment displays the sum of the remaining electric power levels in two modes by having the lastly selected second meter part 91 shown topped with the initially selected first meter part 93 in connected fashion. Getting the meter parts displayed connected in the predetermined order makes it easy to grasp the relations between the limited power modes selected at present and in the future on the one hand and the remaining electric power on the other hand.

Although this embodiment has been explained using examples in which two limited power modes are set, the present invention can also be applied to cases where three or more limited power modes are set. In such cases, the display may simply indicate the remaining electric power in the limited power mode currently selected by the construction machine management unit 12 and the remaining electric power in at least one of the remaining limited power modes excluding the currently selected the limited power mode (e.g., the remaining electric power in the mode with the smallest limited power of all limited power modes).

After the process of calculating the remaining electric power (remaining operation hours) in each limited power mode is performed in step 124 as described above, another process is carried out (step 125) to output to the display device 14 a display signal for displaying the results of the calculations as shown in FIG. 9. This causes the display device 14 to display the remaining electric power levels (remaining operation hours) and other information as shown in FIG. 9. Upon completion of step 125, a process is performed (step 126) to check whether the power supply of the hydraulic shovel is turned off. If the power supply is on, step 122 and subsequent steps are repeated. On the other hand, if the power supply is turned off, the series of the steps above is terminated.

It is preferred that the check in step 126 be performed by the construction machine management unit 12. Also, the series of the steps above may be repeated at intervals of a predetermined set value (e.g., 100 [ms] or 1 [s]). From the second and subsequent rounds of the steps, the process of calculating the total electric power in step 124 may be omitted. Once the OCV and resistance tables are input in step 121, the tables may be stored in a storage device of the construction machine management unit 12, and step 121 may be omitted until the battery pack 18 is replaced next time.

According to this embodiment structured as described above, the display device 14 displays the total remaining electric power including the remaining electric power associated with the limited power mode not currently selected (second limited power mode). This makes it possible to proceed with work while the actual remaining electric power is being verified. Also, the process (step 121) of inputting to the construction machine management unit 12 the information (OCV table and resistance table) for calculating the specification information about the battery pack (battery voltage and internal resistance) is included in the series of the steps for calculating the remaining electric power, which eliminates the need for overwriting the specification information stored in the construction machine management unit 12 concerning the yet-to-be-replaced battery pack with new specification information. This helps facilitate battery replacement work.

Figure 10:
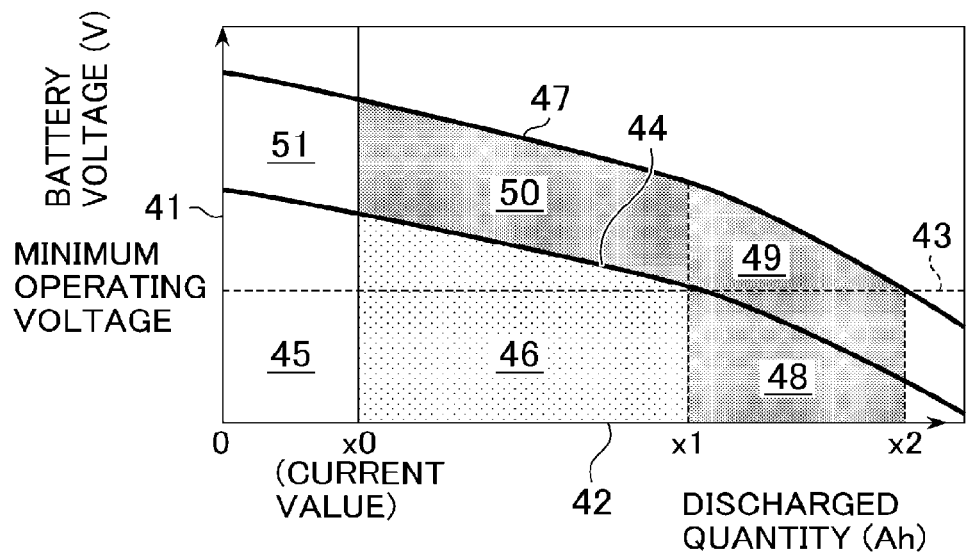
FIG. 10 is an explanatory drawing of a calculation example in which the remaining electric power is calculated when a limited power mode is manually selected via a mode switching device.

Explained next with reference to FIG. 10 is a calculation example of a variation of this embodiment in which the remaining electric power is calculated when the first and the second limited power modes are switched manually via the mode switching device 19. FIG. 10 is an explanatory drawing of a calculation example in which the remaining electric power is calculated when a limited power mode is manually selected via the mode switching device 19. In this case, the second limited power mode can be selected as desired even before the discharged quantity reaches x1, so that the remaining electric power is calculated separately for each of the two limited power modes.

In that case, the remaining electric power E1 of the battery pack 18 when the hydraulic shovel is driven in the first limited power mode is calculated in the same manner as discussed above with reference to FIG. 7. The first battery voltage curve 44 is obtained from the expression (4), before being integrated for the discharged quantity x to calculate the remaining electric power (area of region 46).

Meanwhile, in the second limited power mode, the current I2 is obtained using the expression (3) in the same manner as discussed above, and the second battery voltage curve 47 when the current I2 is allowed to flow is acquired using the expression (6). Furthermore, the discharged quantity x2 at which the battery voltage reaches the minimum operating voltage 43 is obtained. The remaining electric power E2 in the second limited power mode is obtained by integrating the expression (6) for the discharged quantity x over the section between the discharged quantity x0 and the discharged quantity x2 (total area of regions 46, 48, 49 and 50). Also, the total electric power E02 in the second limited power mode is acquired by integrating the expression (6) for the discharged quantity x from 0 to x2 (total area of regions 45, 46, 48, 49, 50 and 51).

Figure 11:
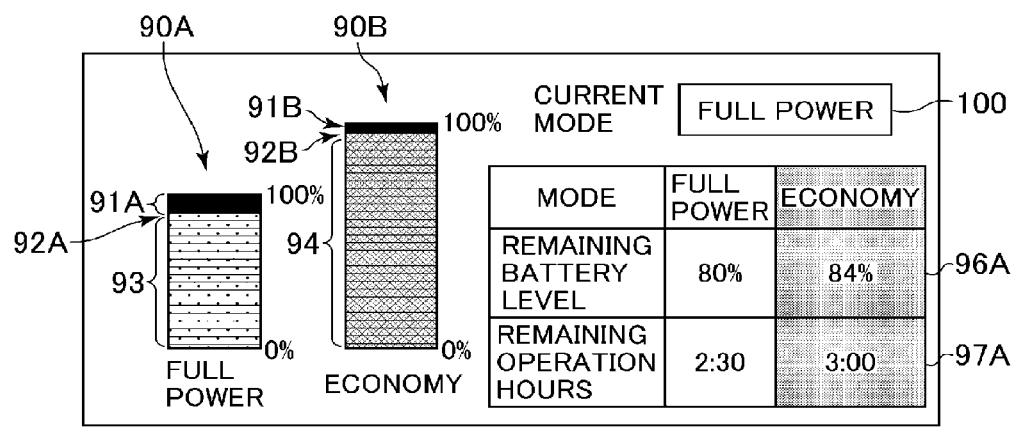
FIG. 11 is an illustration showing a display screen of the display device when a limited power mode can be manually selected in response to the input from the mode switching device.

FIG. 11 is an illustration showing a display screen of the display device 14 when a limited power mode can be manually selected in response to the input from the mode switching device 19. The display screen in this drawing includes a selected mode display part 100, a remaining electric power display part 96A, a remaining operation hour display part 97A, a first meter display part 90A, and a second meter display part 90B.

The remaining electric power display part 96A and remaining operation hour display part 97A are parts that display the remaining electric power and remaining operation hours in each limited power mode. With a view to improving the visibility of the remaining electric power and remaining operation hours in the currently selected limited power mode, the remaining electric power and remaining operation hours associated with the limited power mode not currently selected (economy mode) may be rendered less visible than the remaining electric power and remaining operation hours associated with the currently selected limited power mode (power mode). That is, the indications in the unselected mode may be shown hatched as illustrated, shown translucent, or not shown outright, for example. In the example of FIG. 11, if the operator manually selects economy mode, the indications in power mode are shown hatched.

The first meter display part 90A is a part that displays visually the remaining electric power 92A in the limited power mode currently selected by the construction machine management unit 12 (first limited power mode). As such, the first meter display part 90A is composed of a meter part 93 that displays the remaining electric power when the first limited power mode is continuously selected, and a consumption meter part 91A that indicates the electric power consumed so far.

The second meter display part 90B is a part that displays visually the remaining electric power 92B in the other limited power modes (second limited power mode) excluding the mode currently selected by the construction machine management unit 12. As such, the second meter display part 90B is composed of a meter part 94 that displays the remaining electric power when the second limited power mode is continuously selected, and a consumption meter part 91B that indicates the electric power consumed so far.

In this example, the remaining electric power 92A in the first limited power mode may be calculated using the expression (11) below, and the remaining electric power 92B in the second limited power mode may be computed using the expression (12) below.

[Math. 11]

$$\text{Remaining electric power} = 100 \times E1/E01 \tag{11}$$

E1: Remaining electric power (Wh) in the first limited power mode

E01: Total electric power (Wh) in the first limited power mode

[Math. 12]

$$\text{Remaining electric power} = 100 \times E2/E02 \tag{12}$$

E2: Remaining electric power (Wh) in the second limited power mode

E02: Total electric power (Wh) in the second limited power mode

Also, whereas the remaining electric power levels are shown displayed in meter form in the illustrated example, the remaining operation hours may be displayed in meter form as discussed above. In this case, the remaining electric power 92A in the first limited power mode may be calculated using the expression (13) below, and the remaining electric power 92B in the second limited power mode may be computed using the expression (14) below.

[Math. 13]

$$\text{Remaining operation hours} = (E1/W1) \tag{13}$$

E1: Remaining electric power (Wh) in the first limited power mode

W1: Average power (W) in the first limited power mode

[Math. 14]

$$\text{Remaining operation hours} = (E2/W2) \tag{14}$$

E2: Remaining electric power (Wh) in the second limited power mode

W2: Average power (W) in the second limited power mode

W2: Average power (W) in the second limited power mode

After the process of calculating the remaining electric power (remaining operation hours) in each limited power mode is performed in step 124 as described above, another process is carried out (step 125) to output to the display device 14 a display signal for displaying the results of the calculations as shown in FIG. 11. The rest of the processes are the same as those explained above and thus will not be discussed further.

In the variation of this embodiment structured as explained above, where a limited power mode can be manually selected, the remaining electric power in the limited power mode not currently selected is also displayed on the display device 14. This makes it possible easily to grasp the remaining electric power that applies if the hydraulic shovel is operated in the unselected limited power mode. This also allows work to proceed while the actual remaining electric power is being verified. At the same time, it is easy to select a limited power mode in consideration of work details and remaining electric power. Furthermore, because it takes less time and effort to overwrite the information in the construction machine management unit 12, it is easy to replace the batteries.

Figure 12:
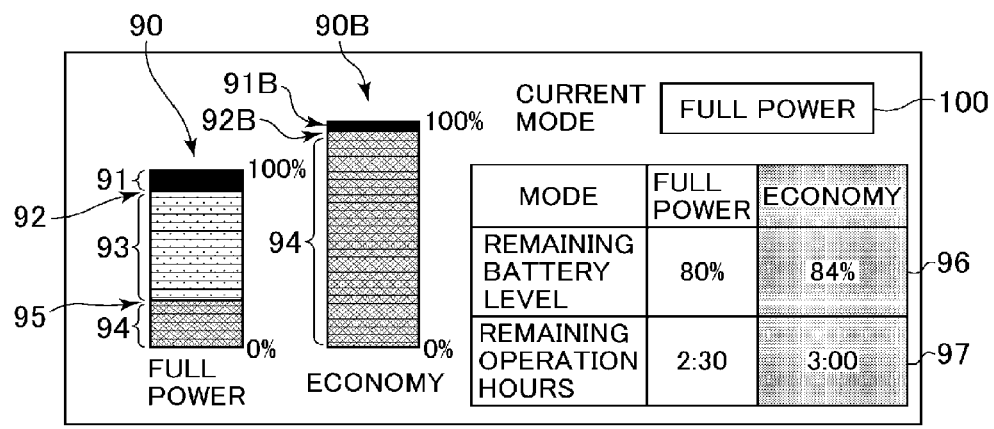
FIG. 12 is an illustration showing a display screen of the display device when a limited power mode is semi-automatically selected.

Explained next with reference to FIG. 12 is a display example of another variation of this embodiment in which, with the first and the second limited power modes manually selectable via the mode switching device 19, the second limited power mode is automatically selected if the voltage of the battery pack 18 reaches the operating voltage while the first limited power mode is being selected (this case may be referred to hereunder as the case where a limited power mode is selected semi-automatically).

FIG. 12 is an illustration showing a display screen of the display device 14 when a limited power mode is semi-automatically selected. The display screen shown in this drawing includes a first meter display part 90, a second meter display part 90B, a selected mode display part 100, a remaining electric power display part 96A, and a remaining operation hour display part 97A.

The first meter display part 90 is the same as the meter display part 90 shown in FIG. 9. That is, where the first limited power mode is in effect, a drop of the battery voltage to the operating voltage causes the second limited power mode to be automatically selected by specification. The remaining electric power levels in the first and the second limited power modes are displayed simultaneously. Where remaining electric power levels are displayed as shown in the illustrated example, the remaining electric power in the first limited power mode may be obtained using the expression (7) above. If operation hours are to be displayed, they may be acquired using the expression (9) above.

After the process of calculating the remaining electric power (remaining operation hours) in each limited power mode is performed in step 124 as described above, another process is carried out (step 125) to output to the display device 14 a display signal for displaying the results of the calculations as shown in FIG. 12. The rest of the processes are the same as those explained above and thus will not be discussed further.

According to the variation structured as described above, the effects of the preceding variation are supplemented with the ease in taking into account the remaining electric power associated with the limited power mode (second limited power mode) ultimately selected automatically following the decrease of the battery voltage. This allows work to be carried out while the actual remaining electric power is being considered.

In the two variations described above, the meter display part for the currently selected limited power mode and the meter display part for the unselected limited power mode are shown displayed concurrently by specification. Alternatively, with a view to relatively improving the visibility of the former display part relative to the latter display part, the latter display part may be shown hatched or otherwise treated to lower its visibility (the same process as that explained above with reference to FIG. 11 may be performed). If the latter display part is not to be displayed, the construction machine management unit 12 may be connected separately with a display switching device for selecting whether or not to display the remaining electric power in the currently unselected limited power mode in meter form, and either display or non-display of the meter display part may be selected via the switching device.

A second embodiment of the present invention is explained next. This embodiment differs from the preceding embodiment in that the remaining electric power is calculated by the battery management unit 11.

FIG. 13 is a flowchart of a remaining electric power calculation process performed by the battery management unit 11 according to the second embodiment of the present invention. The flowchart in FIG. 13 is started when the power supply of the hydraulic shovel is turned on from the off-state. Carried out first is the process of inputting the limited power value and operating voltage value (see FIG. 5) in each limited power mode to the battery management unit 11 from the construction machine management unit 12 (step 21). In the case of a system of which the limited power remains unchanged regardless of changes in motor temperature, inverter temperature or outdoor temperature, step 21 may be performed only upon shipment from the factory or upon replacement of batteries.

Next, the battery management unit 11 performs the process of calculating the charging rate of the battery pack 18 (step 22) and, based on the charging rate thus calculated, on the OCV table and on the resistance table, carries out the process of calculating the OCV value and resistance value of the battery pack 18 in the state of charge at that point (step 23).

The battery management unit 11 then calculates the remaining electric power of the battery pack 18 in each limited power mode based on the OCV value and the resistance value of the battery pack 18 calculated in step 23 as well as on the limited power and operating voltage prescribed for each of different limited power modes (step 24). The detailed method of calculation is the same as with the preceding embodiment and thus will not be discussed further.

After the process of calculating the remaining electric power (remaining operation hours) in each limited power mode is performed in step 24, the results of the calculations are output to the construction machine management unit 12 (step 25). In this case, there exists a method for outputting the results of the calculations in step 24 in the form shown in FIG. 8, for example. Given the calculation results input from the battery management unit 11, the construction machine management unit 12 performs the process of outputting to the display device 14 a display signal for displaying the calculation results. The detailed process here is the same as step 125 explained above in connection with the preceding embodiment and thus will not be discussed further. The signal causes the display device 14 to display the remaining electric power (or remaining operation hours) and other information.

Following step 25 and upon completion of display by the construction machine management unit 12, a process is performed (step 26) to check whether the power supply of the hydraulic shovel is turned off. If the power supply remains on, step 22 and subsequent steps are repeated; if the power supply is turned off, the series of the steps is terminated.

As described above, when the battery management unit 11 calculates the remaining electric power, the remaining electric power (or remaining operation hours) of the battery pack 18 can still be displayed. This provides the same effects as those of the first embodiment.

Although the so-called battery shovel has been cited as an example in the foregoing explanation, this is not limitative of the present invention. Alternatively, the invention can be applied to any construction machines having a system that converts the electric power of batteries into motive power. Construction machines of this type include the wheel loader and dump track each having its traction motor driven by electric power from batteries, for example. In addition to the electrically driven construction machines, this invention can also be applied to hybrid construction machines having electric actuators driven by an engine and generator motors.

DESCRIPTION OF REFERENCE CHARACTERS

6 Hydraulic pump
10 Battery module
11 Battery management unit
12 Construction machine management unit
14 Display device
16 Inverter device
17 Motor
18 Battery pack
19 Mode switching device
61 Open circuit voltage
62 Charging rate
71 Charging rate
72 Current
73 Resistance
90 Meter display part
92 Remaining electric power
93 Remaining electric power in the first limited power mode
94 Remaining electric power in the second limited power mode
96 Remaining electric power display part
97 Remaining operation hour display part
100 Selected mode display part

What is claimed is:
1. A construction machine comprising:
an inverter that controls a motor;
a battery charged and discharged via the inverter;
a battery controller configured to monitor charging and discharging of the battery;
a main controller configured to control the inverter based on a plurality of limited power modes prescribed in order to limit an output of the battery; and
a monitor that displays a remaining electric power of the battery,
wherein the battery controller outputs open circuit voltage and battery resistance information as specification information about the battery, as well as a state of energy of the battery, into the main controller,
wherein the main controller calculates an open circuit voltage value and a battery resistance value of the battery at the state of energy of the battery based on the specification information about the battery and the state of energy of the battery which are output from the battery controller, calculates an amount of electric power stored in the battery in each of the limited power modes based on the open circuit voltage value and the battery resistance value of the battery as well as limited power and operating voltage prescribed for each of the limited power modes, and outputs a display signal for displaying the amount of electric power stored in the battery in each of the limited power modes into the monitor,
wherein the plurality of limited power modes include a first mode and a second mode, a limited power of the second mode being smaller than a limited power of the first mode,
wherein the main controller automatically switches the limited power mode from the first mode to the second mode when the first mode is selected as the limited power mode and when a battery voltage of the battery reaches a minimum operating voltage in the first mode,
wherein the monitor displays a first meter part and a second meter part when the first mode is selected as the limited power mode, the first meter part indicating a remaining electric power in the first mode, the second meter part indicating a remaining electric power in the second mode after the main controller automatically switches the limited power mode from the first mode to the second mode, and
wherein the first meter part and the second meter part are displayed in a contiguous fashion on a display of the monitor with a boundary position therebetween indicating a position where the main controller is to automatically switch the limited power mode from the first mode to the second mode.

2. The construction machine of claim 1,
wherein the main controller calculates remaining operation hours of the construction machine in each of the plurality of limited power modes based on the amount of electric power stored in the battery in the each of the plurality of limited power modes,
wherein the monitor displays a remaining operation hour display part that indicates the remaining operation hours when the construction machine is operated with an average power prescribed for the each of the plurality of limited power modes, and
wherein, when the first mode is selected, the remaining operation hour display part displays a total value of the remaining operation hour in the first mode and the remaining operation hour in the second mode after the main controller automatically switches the limited power mode from the first mode to the second mode.

3. A construction machine for converting electric power stored in a battery into motive power, the construction machine comprising:
a controller configured to control the construction machine based on a plurality of limited power modes prescribed in order to limit an output of the battery, and to calculate an amount of electric power stored in the battery in each of the limited power modes based on specification information including open circuit voltage and battery resistance information about the battery, on a state of energy of the battery, and on limited power and an operating voltage prescribed for each of the limited power modes; and a monitor configured to display, based on the amount of electric power calculated by the controller, the amount of electric power in a currently selected limited power mode and the amount of electric power in at least one of remaining limited power modes excluding the selected limited power mode, wherein the plurality of limited power modes include a first mode and a second mode, a limited power of the second mode being smaller than a limited power of the first mode, wherein the controller automatically switches the limited power mode from the first mode to the second mode when the first mode is selected as the limited power mode and when a battery voltage of the battery reaches a minimum operating voltage in the first mode, wherein the monitor displays a first meter part and a second meter part when the first mode is selected as the limited power mode, the first meter part indicating a remaining electric power in the first mode, the second meter part indicating a remaining electric power in the second mode after the controller automatically switches the limited power mode from the first mode to the second mode, and wherein the first meter part and the second meter part are displayed in a contiguous fashion on a display of the monitor with a boundary position therebetween indicating a position where the controller is to automatically switch the limited power mode from the first mode to the second mode.

\* \* \* \* \*